Dec. 15, 1959 R. V. GRAY 2,916,924
VARIABLE ROTARY POWER-TRANSMITTING APPARATUS
Filed July 19, 1955 2 Sheets-Sheet 2
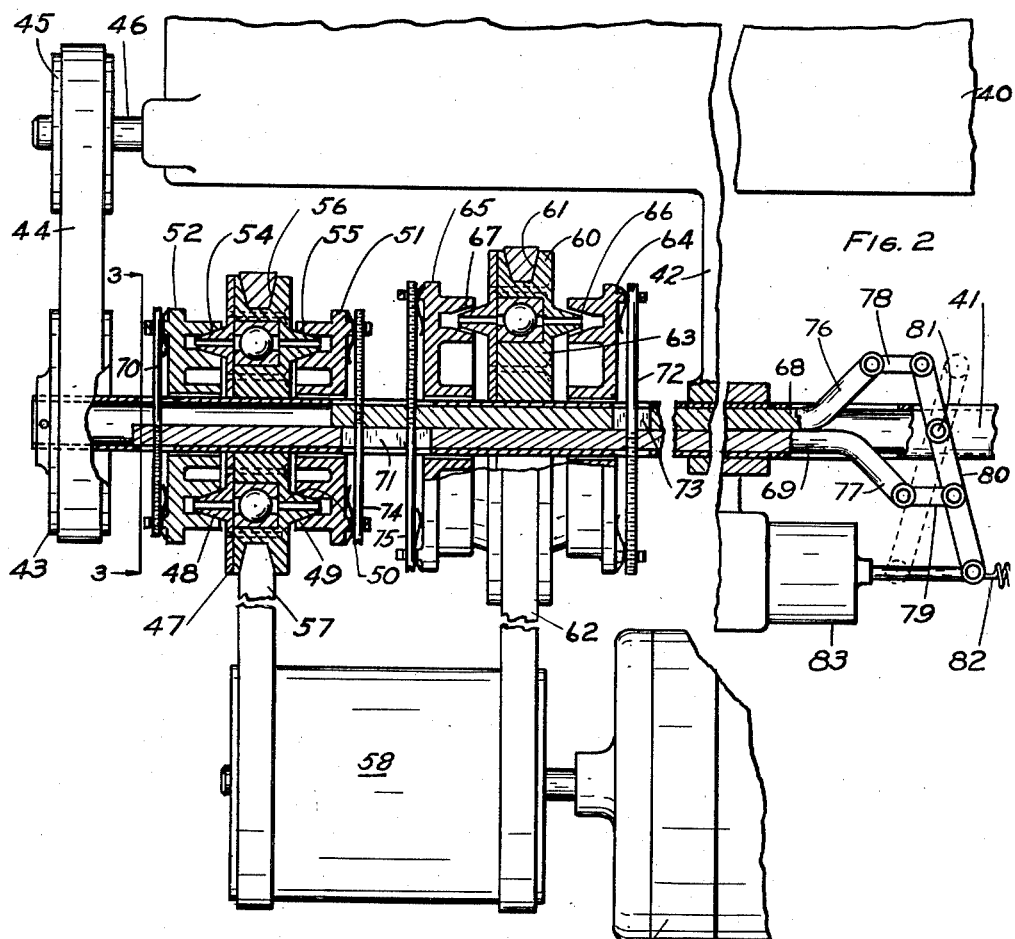
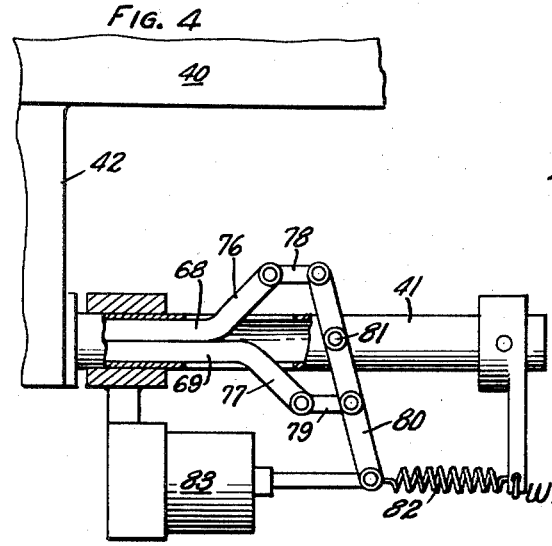
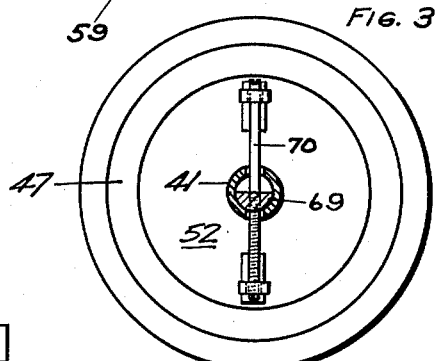
INVENTOR.
RONALD V. GRAY
BY
Williamson, Schroeder, Adams, + Meyers
ATTORNEYS

United States Patent Office 2,916,924
Patented Dec. 15, 1959

2,916,924

VARIABLE ROTARY POWER-TRANSMITTING APPARATUS

Ronald V. Gray, Duluth, Minn., assignor of one-third to Herbert H. Johnson and one-third to Orland W. Tangen, both of Duluth, Minn.

Application July 19, 1955, Serial No. 522,960

8 Claims. (Cl. 74—217)

This invention relates to power-transmitting apparatus. More particularly, it relates to variable apparatus for transmitting power from a driven member to another element which is to be driven under varying conditions.

In various machines, it is often desirable to take power off the main source of power and transfer it to one of the auxiliary or associated units. In such cases it is often highly desirable that the transfer be effected under other than constant conditions. For example, it is common practice to drive the generator of an automobile from the fan shaft of the automobile. The speed of the fan shaft is ordinarily directly proportional to the speed of the motor itself. Thus when the motor is driven at high speeds, the generator is also operated at a high speed, and when the motor of the automobile is operated at low speeds, the speed at which the generator is operated is reduced very substantially. This is not ideal, for when the motor is operating at high speeds the battery will tend to be overcharged by the generator, and when the automobile is operated at low speeds, the battery will discharge and excessive drainage upon the battery will take place if the motor is operated at such low speed for a prolonged period. This is especially true under conditions such as when the headlights, the radio and other electrically operated devices are being utilized by the owner of the automobile. In such instances, there is a heavy drainage upon the battery and the generator is unable to generate sufficient current to supply the needs of these devices. Thus it can be seen that it would be preferable to operate the generator at relatively lower speeds when the motor of the automobile is running at high speed, and to speed up the operation of the generator when the motor of the automobile is operating at low speeds. My invention is directed toward providing rotary power-transmitting mechanism which is variable and will satisfy this need. There are other instances when my variable power-transmitting apparatus could be used to advantage. All of these instances hinge upon the need for being able to readily vary the velocity ratio between the driven member and the element which is to be driven, and my apparatus fulfills this need.

It is a general object of my invention to provide novel and improved variable power-transmitting apparatus for transmitting rotary power.

A more specific object is to provide novel and improved power-transmitting apparatus which is variable and rotary in nature.

Another object is to provide novel and improved power-transmitting apparatus for transmitting rotary power and which is velocity-responsive.

Another object is to provide novel and improved power-transmitting apparatus which will automatically vary the velocity ratio between the driven member and the element which is to be driven as the velocity of the driven rotary member varies.

Another object is to provide novel and improved power-transmitting apparatus which will automatically increase the velocity ratio between the velocity of the driven member and the element to be driven whenever the velocity of the driven member decreases, and which will decrease the velocity ratio between the driven member and the element to be driven whenever the driven member is operated at higher velocities.

Another object is to provide variable rotary power-transmitting apparatus which will shift at different velocities to increase the velocity ratio between the driven member and the rotary element to be driven, and wherein the shifting is controlled by control mechanism which in turn may be governed by electrical devices or velocity-responsive mechanisms.

These and other objects and advantages of the invention will more fully appear from the following description made in connection with the accompanying drawings, wherein like reference characters refer to the same or similar parts throughout the several views, and in which:

Fig. 2 is a plan view of a second embodiment of my invention with portions thereof shown in section to better illustrate its construction;

Fig. 3 is a vertical sectional view taken along line 3—3 of Fig. 2; and

Fig. 4 is a fragmentary elevational view showing the right hand end portion of the same embodiment as viewed in Fig. 2, portions thereof being shown in section.

Figure 1:
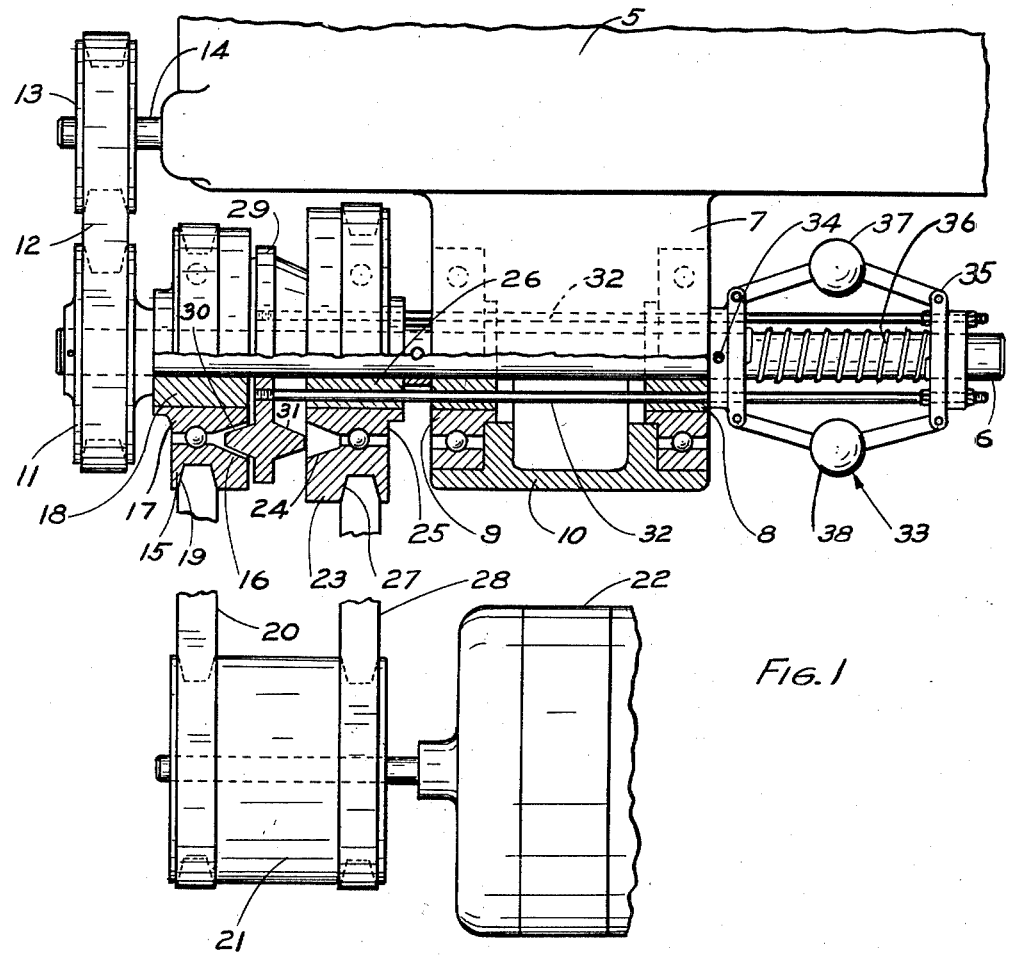
Fig. 1 is a plan view of one embodiment of my invention with portions thereof broken away to show the construction in section.

One embodiment of my invention may include, as shown in Fig. 1, a source of power such as a motor 5 connected in driving relation to a driven member such as the hollow shaft 6. As shown, this shaft 6 is rotatably mounted on the motor 5 by a mounting bracket 7. The mounting bracket 7 includes a bushing 8 and an inner race 9 and an outer race 10 of a ball bearing arrangement. The shaft 6 carries a pulley 11 at one of its ends and this pulley is connected by a belt 12 to a pulley 13 which is mounted on a shaft 14 extending outwardly from the motor 5 and driven thereby.

Mounted on the shaft 6 for rotation thereabout is a first rotary power-transmitting member or outer race 15. As shown, this rotary member is comprised of an outer race which carries an axially extending annular beveled surface 16. This outer race 15 is free to rotate about the inner race 17 and the shaft 6 unless locked thereto by the drive mechanism to be hereinafter described. The inner race is carried by a bushing 18 which encircles the shaft 6. A groove 19 in the circumferential surface of the outer race 15 accommodates a V-belt 20 which extends around the pulley 21 mounted on the generator 22 in driving relation.

A second rotary power-transmitting member is mounted on the shaft 6 for rotation thereabout and is comprised of the rotary member or outer race 23 which has a beveled surface 24 similar to the beveled surface 16 but extending in an opposite direction and facing the same. The outer race 23 is free to rotate about the shaft 6 and about the inner race 25 which is carried by the bushing 26. A groove 27 formed in the circumferential surface of the rotary member 23 accommodates a V-belt 28 which also extends around the pulley 21 of the generator 22. The two V-belts 20 and 28 drive the pulley 21 and the generator 22 when they in turn are driven by either of the outer races 15 or 23. It will be noted that the diameter of the outer race 23 is greater than the diameter of the outer race 15. It will also be noted that each of the outer races is free to rotate relative to its associated inner races so that unless locked to the shaft 6 by some other means, the shaft 6 will rotate freely relative to these two rotary members.

Mounted on the shaft 6 between the two bushings 18 and 26 is an engaging disc 29. This disc is annular in shape and has a pair of annular beveled drive elements 30 and 31 extending axially therefrom in opposite directions. It will be noted that these drive elements 30 and 31 have beveled surfaces which adapt them to engage the beveled surfaces of the associated inner and outer races. These drive elements 30 and 31, when urged against a pair of these beveled surfaces, serve to connect or lock the outer race 15 or 23, as the case may be, to the shaft 6, and are positioned or controlled by a pair of control rods such as the rod 32 each of which extends through the bushings 26 and 8 and is threaded at its end into the disc 29. These control rods 32 are free to slide longitudinally of the shaft 6 and relative to the bushings 8 and 26 so that as it shifts to the left or the right as shown in Fig. 1, the disc 29 and its drive elements 30 and 31 will be moved therewith into or out of engagement, as the case may be, with the beveled surfaces 16 and 24 of the outer races 15 and 23. Thus, the elements 29–38 inclusive constitute a variable rotary drive mechanism for connecting the races 17, 15 and 9, 23.

Secured to the shaft 6 for rotation therewith and also secured to the other end of the control rods, is a fly ball control mechanism indicated generally as 33. This fly ball control mechanism is secured to the shaft by a pin 34 so that it rotates with the shaft as do the control rods. The outer end portion 35 of the fly ball control mechanism 33 is free to slide lengthwise of the shaft 6 and in so doing to move the control rods 32 lengthwise of the shaft. This free end portion is urged outwardly constantly by a spring 36 and the balls 37 and 38 tend to constantly draw the free end portion 35 inwardly toward the fixed end portion as the balls rotate. The faster the shaft 6 and the balls 37 and 38 rotate, the greater will be the tendency for the free end portion 35 to be drawn inwardly against the action of the spring 36 and this forces the rods 32 to push the disc 29 to the left as viewed in Fig. 1 so that the drive element 30 will firmly engage the outer race 15 and lock or secure that race to the shaft 6 for rotation therewith. In this manner the belt 20 will be compelled to drive the generator 22. The faster the shaft 6 is rotated, the more firmly the drive element 30 will engage the outer race 15, and thus the generator will be driven at a velocity ratio determined by the smaller diameter of the outer race 15.

As the speed of the motor 5 is decreased, the centrifugal force acting upon the balls 37 and 38 will be decreased correspondingly and the outward urging of the spring 36 will tend to urge the free end portion 35 of the fly ball control mechanism 33 to the right, as viewed in Fig. 1, until finally the drive element 30 will clear the beveled surface 16 of the outer race 15 and the drive element 31 will engage the beveled surface 24 of the outer race 23. When this takes place, the belt 28 will drive the generator 22 for the outer race 23 will become locked or secured to the shaft 6 for rotation therein. Since the diameter of the outer race 23 is greater than the diameter of the outer race 15, it will be readily seen that the velocity ratio will be increased when this takes place. Although the motor 5 operates at a relatively slow speed, the generator will be operated at a greater speed than would otherwise take place if a direct and constant drive mechanism were disposed between the driven member 6 and the element to be driven. Thus the generator can be operated at a more moderate speed when the motor 5 is operated at high speeds by merely using an outer race 15 of smaller diameter than would ordinarily be used and by using an outer race 23 of slightly larger diameter than would ordinarily be used. Such an arrangement gives the desired result of maintaining the speed of the generator at a sufficiently high level to produce the desired result without imposing upon the generator overcharging tendencies when the motor 5 is operated at high speeds.

The second form of my invention is shown in Figs. 2 and 3. As shown, it may include a source of power such as a motor 40 with a driven member such as the hollow shaft 41 which is rotatably supported on the motor by the bracket 42. The shaft 41 carries a pulley 43 connected by a belt 44 to a pulley 45 mounted on the shaft 46 which extends outwardly from the motor 40.

In this form of my invention, I again utilize outer races of different diameters, but I provide apparatus for engaging the rotary members at opposite sides simultaneously so as to reduce the strain and wear on the ball bearing mechanisms. I have found that if the rotary members are engaged at only one of their sides, there is a tendency to give a tilting action against the rotary member which may cause undue wearing upon the ball-bearing arrangement. The embodiment shown in Figs. 2 and 3 obviates this possibility. The first rotary power-transmitting member is comprised of an outer race 47 which has a pair of annular beveled axially extending flanges 48 and 49 extending outwardly from opposite sides. This outer race 47 is associated wtih an inner race 50 which also has a pair of axially extending flanges extending outwardly from opposite sides and having beveled surfaces. The associated flanges of the inner and outer races 47 and 50 are adapted to be engaged by a pair of engaging discs 51 and 52 which are disposed at opposite sides of the outer race 47. Each of these engaging discs 51 and 52 has beveled annular grooves or sets such as 54 and 55 adapted to engage the beveled flanges 48 and 49 of the outer race 47.

The first rotary member 47 has a circumferential groove 56 formed therein to accommodate a belt 57 which extends around the pulley 58 of the generator 59 to drive the generator when the member 47 is driven.

The second power-transmitting member 60 is an outer race with a similar groove 61 therein accommodating a belt 62 which also encircles the pulley 58 of the generator 59. This outer race 60 is associated with an inner race 63 and each has axially extending flanges wtih beveled surfaces similar to the construction of the inner and outer races shown to the left in Fig. 2. These flanges are adapted to engage a pair of opposite engaging discs 64 and 65 in grooves 66 and 67 provided for that purpose. These discs 64 and 65 are free to shift longitudinally of the shaft 41 just as are the discs 52 and 51. When the flanges of the outer race 60 are engaged by the beveled surfaces 66 and 67, the outer race 60 will be driven by the shaft 41 because each of these engaging discs is secured to the shaft 41 against relative rotation.

Extending through the hollow shaft 41 is a pair of control rods 68 and 69. The control rod 69 extends sufficiently far to the left, as shown in Fig. 2, so that a transversely disposed member 70 may pass therethrough and threadably engage the same, this transverse rod 70 being secured to the engaging plate 52 as best shown in Figs. 2 and 3. The medial portion of this rod 69 is slotted as at 71 and is threadably engaged by a transversely disposed rod 72 which is secured to the engaging disc 64 in a manner similar to that shown in Fig. 2. The control rod 68 is slotted at 73 to permit longitudinal movement of that rod relative to the transversely disposed rod 72, as shown in Fig. 3. One end portion of this rod 68 is threadably engaged by a pair of transversely extending securing rods 74 and 75, the former of which is secured to the engaging disc 51 and the latter of which is secured to the engaging disc 65. Thus the rod 68 may be shifted longitudinally and in so doing will shift the engaging discs 51 and 65 therewith. At the same time, the rod 69 may be shifted longitudinally and will carry therewith the engaging discs 52 and 64.

The other end portions of the control rods 68 and 69 diverge outwardly as shown at 76 and 77. These diverging ends are connected by links 78 and 79 to a lever member 80 which is pivotally mounted at 81 upon the shaft 41 so as to rotate therewith. The free end of the lever 80 is urged in one direction by a spring member 82 and may be urged in the opposite direction by a solenoid 83 which is mounted upon the shaft 41 for rotation therewith, as best shown in Fig. 2. This solenoid may be electrically actuated and controlled as desired.

The structure shown in Fig. 2 will be held in the position shown in solid lines by the spring 82 so long as the solenoid 83 is not actuated. It will be noted that in this position, the control rod 68 is thrust to the left while the control rod 69 is drawn to the right. In moving to the left, the control rod 68 urges the engaging disc 51 into engaging position relative to the outer race 47 and into disengaging position relative to the outer race 60. At the same time the movement of the control rod 69 to the right brings the engaging disc 52 into engaging relation with the outer disc 47 and the engaging disc 64 into non-engaging relation with the outer race 60. As a result the outer race 47 will be driven at the same speed as the shaft 41, and since the diameter of the outer race 47 is relatively small, the velocity ratio between the shaft 41 and the generator 59 will be less than when the race 60 is driving the generator. It will be readily apparent that this latter condition takes place when the solenoid 83 is actuated so as to cause the lever 80 to shift to the broken line position and thereby draw the control rod 68 to the right and force the control rod 69 to the left. Such shifting movement will cause the engaging discs 64 and 65 to engage the outer race 60 and to simultaneously cause the engaging discs 51 and 52 to free the outer race 47.

From the above, it can be readily seen that I have provided a novel apparatus which will automatically vary the velocity ratio between the driven member and the element to be driven in accordance with the velocity of the driven member. As arranged, this apparatus will increase the velocity ratio when the velocity of the driven member is decreased substantially, and will decrease the velocity ratio when the speed of the driven member is increased substantially. It will be readily apparent that this variable rotary power-transmitting mechanism has many applications and therefore it is not to be considered to be limited to the particular application described herein.

It will, of course, be understood that various changes may be made in the form, details, arrangement and proportions of the various parts without departing from the scope of my invention.

What I claim is:

1. Variable rotary power-transmitting apparatus comprising a rotary driven member adapted to be connected in driven relation to a source of rotary power, a rotary power-transmitting member mounted on said driven membe in relatively rotatable relation and adapted to be connected in driving relation to a rotary element to be driven, a second rotary power-transmitting member mounted on said driven member in relatively rotatable relation and adapted to be connected in driving relation to the rotary element to be driven, and drive mechanism alternately connecting said power-transmitting members in driving relation with said driven member, said drive mechanism being mounted on said driven member for rotation therewith and connected thereto to preclude relative rotation therebetween and shiftable thereon into and out of engagement with each of said power-transmitting members to respectively lock and unlock said member to said driven member whereby power may be transmitted from said driven member to the rotary element to be driven, said drive mechanism simultaneously engaging opposite sides of said power-transmitting members when in driving relation therewith.

2. Power-transmitting apparatus comprising a driving member, means for rotating the said driving member, a first rotary member mounted on said driving member and connected thereto in driven relation, a second rotary member concentrically disposed with respect to the first rotary member, and anti-friction bearing means concentrically disposed and held between the said rotary members, and means mounted for axial movement toward and away from said rotary members but closely adjacent the same for releasably contacting each rotary member and rigidly connecting the rotary members directly to each other, whereby the first rotary member, when the shaft is rotated, will be placed in power-transmission relation with said driven rotary member and will drive the driven rotary member in unison therewith.

3. Power-transmitting apparatus as defined in claim 2 wherein the last means surrounds said driving member, and linkage mechanism fixed to said last means, and serving simultaneously to mount said last means for rotation with said driving member and to effect the axial shifting of such last means.

4. Power-transmitting apparatus as defined in claim 2 wherein a further first rotary member is mounted on said driving member and rotatable therewith and disposed in predetermined spaced relationship to the first mentioned first rotary member, a further second rotary member concentrically disposed with respect to the last mentioned first rotary member, anti-friction bearing means disposed and held between the last mentioned rotary members, said means for releasably contacting the rotary members being in the form of a disc surrounding said driving member and interposed between the two first rotary members, and rods fixed at one end to said disc and slidably mounted on said driving member to effect the axial shifting of said disc between positions alternately engaging the two sets of rotary members and for simultaneously mounting the disc for rotation in unison with said driving member.

5. Power-transmitting apparatus as defined in claim 2 wherein the last mentioned means is velocity-responsive.

6. Power-transmitting apparatus comprising a driving shaft and a driven shaft rotatably supported in spaced parallel relationship to each other, first and second power-transmitting assemblies mounted on said driving shaft and means connecting said driven shaft to said power-transmitting assemblies for selective variable drive between the driving and driven shafts, each of said power-transmitting assemblies including an inner member fixed to said driving shaft for rotation therewith, an outer member surrounding the inner member, and means rotatably supporting the outer member concentrically around the inner member, said inner members of the two power-transmitting assemblies being disposed in longitudinally spaced apart relationship on said driving shaft and the inner and outer members of each power-transmitting assembly having coplanar circumferential friction surfaces rotatable with the respective inner and outer members, and friction means surrounding said driving shaft and interposed between said inner members and shiftable longitudinally therebetween for selectively engaging said coplanar circumferential friction surfaces such that the inner and outer members of the power-transmitting assemblies are selectively alternately locked together such that their inner and outer members are in direct power-transmitting relation and rotate together with said driving shaft to transmit power to the driven shaft directly through the inner and outer members by way of the intervening friction means, said friction means being loosely fitted on said driving shaft for longitudinal shifting therealong and having friction surfaces engageable, in response to axially shifting of the friction means, with said coplanar circumferential friction surfaces of said pulley assemblies, and means rotatable with said driving shaft and connected to said friction means for effecting simultaneously the axial shifting thereof and for mounting such friction means for rotation with the driving shaft.

7. Power-transmitting apparatus comprising a driving rotary member, a driven rotary member, an inner ball race connected to one of said members, an outer ball race surrounding said inner ball race and connected to the other of said members, a plurality of balls disposed between said races, and shiftable means movable axially of said races into and out of direct bridging contact with said inner and outer races to selectively permit relative rotation between the races when said means is out of bridging contact therewith and couple said driving and driven members when said means directly contacts the inner and outer races.

8. Power-transmitting apparatus comprising a driving rotary member, a driven rotary member, an inner ball race connected to one of said members, an outer ball race surrounding said inner ball race and connected to the other of said members, a plurality of balls disposed between said races, means for releasably connecting said inner and outer ball races to each other in direct power-transmitting relation to prevent relative rotation therebetween whereby said driving member will be placed in power-transmitting relation with said driven member and will drive the same, a second inner ball race connected to the same member as said first mentioned inner ball race, a second outer ball race surrounding said second mentioned inner ball race and being connected to the same member as said first mentioned outer ball race but in a different power-transmitting ratio, and a plurality of balls disposed between said second mentioned ball races, said means being shiftable to alternately connect said first mentioned races and said second mentioned races to each other.

References Cited in the file of this patent

UNITED STATES PATENTS

| | | |
|---|---|---|
| 543,174 | Collins | July 23, 1895 |
| 569,230 | Quintus | Oct. 13, 1896 |
| 980,435 | Prentice | Jan. 3, 1911 |
| 1,129,906 | Roberts et al. | Mar. 2, 1915 |
| 1,922,624 | Lombardo | Aug. 15, 1933 |
| 2,078,020 | Ridgeway | Apr. 20, 1937 |
| 2,307,881 | Dodge | Jan. 12, 1943 |
| 2,401,317 | Richards | June 4, 1946 |
| 2,568,134 | Tharpe | Sept. 18, 1951 |
| 2,641,137 | Orcutt et al. | June 9, 1953 |
| 2,658,593 | Doebeli | Nov. 10, 1953 |
| 2,807,172 | Jacobs | Sept. 24, 1957 |